United States Patent
Sinnadurai et al.

(10) Patent No.: US 10,586,004 B2
(45) Date of Patent: Mar. 10, 2020

(54) METHOD AND APPARATUS FOR UTILIZING ESTIMATIONS FOR REGISTER RETIMING IN A DESIGN COMPILATION FLOW

(71) Applicant: Altera Corporation, San Jose, CA (US)

(72) Inventors: Nishanth Sinnadurai, Scarborough (CA); Benjamin Gamsa, Toronto (CA)

(73) Assignee: Altera Corporation, San Jose, CA (US)

(*) Notice: Subject to any disclaimer, the term of this patent is extended or adjusted under 35 U.S.C. 154(b) by 88 days.

(21) Appl. No.: 14/746,237

(22) Filed: Jun. 22, 2015

(65) Prior Publication Data

US 2016/0371403 A1   Dec. 22, 2016

(51) Int. Cl.
G06F 17/50   (2006.01)

(52) U.S. Cl.
CPC ........ *G06F 17/505* (2013.01); *G06F 17/5054* (2013.01); *G06F 17/5072* (2013.01); *G06F 17/5077* (2013.01); *G06F 17/5081* (2013.01); *G06F 2217/84* (2013.01)

(58) Field of Classification Search
CPC .. G06F 17/5045; G06F 17/5054; G06F 17/50; G06F 17/5068; G06F 17/505; G06F 17/5072; G06F 17/5077; G06F 17/5081; G06F 2217/84
See application file for complete search history.

(56) References Cited

U.S. PATENT DOCUMENTS

| | | | |
|---|---|---|---|
| 7,120,883 B1* | 10/2006 | van Antwerpen | G06F 17/5045 716/102 |
| 7,337,100 B1* | 2/2008 | Hutton | G06F 17/5068 703/13 |
| 7,424,697 B1* | 9/2008 | Arslan | G06F 17/5031 716/116 |
| 7,620,927 B1* | 11/2009 | Ochotta | G06F 17/5054 716/105 |
| 8,296,696 B1* | 10/2012 | Chiu | G06F 17/5054 716/104 |
| 8,677,298 B1 | 3/2014 | Manohararajah et al. | |
| 8,893,071 B1* | 11/2014 | Gaide | G06F 17/5054 716/113 |

(Continued)

FOREIGN PATENT DOCUMENTS

| | | |
|---|---|---|
| CN | 1902632 A | 1/2007 |
| CN | 101312346 A | 11/2008 |
| CN | 101465723 A | 6/2009 |

OTHER PUBLICATIONS

European Search Report for Application No. EP 16 17 2777 dated Nov. 8, 2016.

(Continued)

*Primary Examiner* — Vuthe Siek

(57) ABSTRACT

A method for designing a system on a target device includes performing one of synthesis, placement, and routing on the system. A designer is presented with a timing analysis of the system after one of the synthesis, placement, and routing, wherein the timing analysis reflects register retiming optimizations predicted to be implemented on the system. One of the synthesis, placement, and routing is modified in response to input provided by the designer after the presenting.

20 Claims, 10 Drawing Sheets

(56) References Cited

U.S. PATENT DOCUMENTS 8,918,748 B1 * 12/2014 Chiu .................. G06F 17/5054
716/102
2008/0276212 A1 * 11/2008 Albrecht ............... G06F 17/505
716/122

OTHER PUBLICATIONS

Singh, et al.; "Integrated retiming and placement for field programmable gate arrays"; FPGA '02; Feb. 24-26, 2002, Monterey CA, pp. 67-76.
Bommu, et al.; "Retiring-based factorization for sequential logic optimization"; ACM Transactions on Design Automation of Electronic Systems, ACM, NY; vol. 5, No. 3; Jul. 2000; pp. 373-398.
Chinese and English Translation of P.R. China State Intellectual Property Office First Office Action for Patent Application No. 201610417530.5, dated Dec. 4, 2018, 27 pages.

* cited by examiner

METHOD AND APPARATUS FOR UTILIZING ESTIMATIONS FOR REGISTER RETIMING IN A DESIGN COMPILATION FLOW

FIELD

Embodiments of the present invention relate to tools for designing systems on target devices. More specifically, embodiments of the present invention relate to a method and apparatus for utilizing estimations for register retiming in a design compilation flow.

BACKGROUND

Target devices such as field programmable gate arrays (FPGAs), application specific integrated circuits (ASICs), and structured ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are design generation and integration, synthesis, placement, and routing of the system on the target device.

When addressing conventional timing closure, designers focus on the critical paths in a design. A critical path is a path from a register to another register, through combinational or routing elements, which fails or is close to failing a timing requirement. In an effort to close timing, a designer may examine the critical path and attempt to improve it by reducing an amount of combinational or routing delay along the path.

EDA tools may utilize register retiming algorithms in order to close timing. Register retiming is a synchronous circuit transformation that is used to improve the speed-performance of a synchronous circuit. Register retiming involves moving register across combinational or routing circuit elements in order to reduce the length of timing-critical paths. The combinational structure remains unchanged and the observable behavior of the circuit is identical to the original circuit.

SUMMARY

According to an embodiment of the present invention, a timing analysis is performed after each synthesis, placement, and routing procedure in a design compilation flow for a system. The timing analysis is provided to a designer and the designer is allowed to modify the design for the system without having to wait for the entire compilation of the design to be completed. According to an embodiment of the present invention, the timing analysis and other procedures in the compilation are performed by a processor, and the timing analysis is output to the designer. According to an aspect of the present invention, the timing analysis provided to the designer is a retiming aware timing analysis which reflects post placement and post routing register retiming optimizations that are predicted to be implemented. In order to reflect the post placement and post routing register retiming optimizations predicted to be implemented, skews may be applied to registers and/or positive/negative delay elements may be added onto data paths to model an effect of actual, discrete register retiming. According to another aspect of the present invention, the post placement and post routing register retiming optimizations predicted to be implemented are enabled by speculative changes made to the design of the system. The speculative changes may be presented to the designer with timing analysis results, and actual changes to the design may be made in response to feedback provided by the designer. By performing timing analysis that reflects post placement and post routing register retiming optimizations, presenting the timing analysis to a designer, and allowing modifications prior to a compilation of an entire system, embodiments of the present invention allows the system to be designed on a target device in a shorter period of time than previous known approaches and is an improvement in the technical field.

According to an embodiment of the present invention, a method for designing a system on a target device includes performing one of synthesis, placement, and routing on the system. A designer is presented with a timing analysis of the system after one of the synthesis, placement, and routing, wherein the timing analysis reflects register retiming optimizations predicted to be implemented on the system. One of the synthesis, placement, and routing is re-run, and previous results from one of the synthesis, placement, and routing is modified in response to input provided by the designer after the presenting.

According to an embodiment of the present invention, a method for designing a system on a target device includes applying speculative changes to a design of the system to improve register retiming. Register retiming optimizations to be implemented on the system are predicted in response to the speculative changes applied. A designer is presented with a timing analysis of the system after one of the synthesis, placement, and routing, wherein the timing analysis reflects the register retiming optimizations predicted to be implemented on the system and the speculative changes applied. One of the synthesis, placement, and routing is re-run, and previous results from one of the synthesis, placement, and routing is modified in response to input provided by the designer after the presenting.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
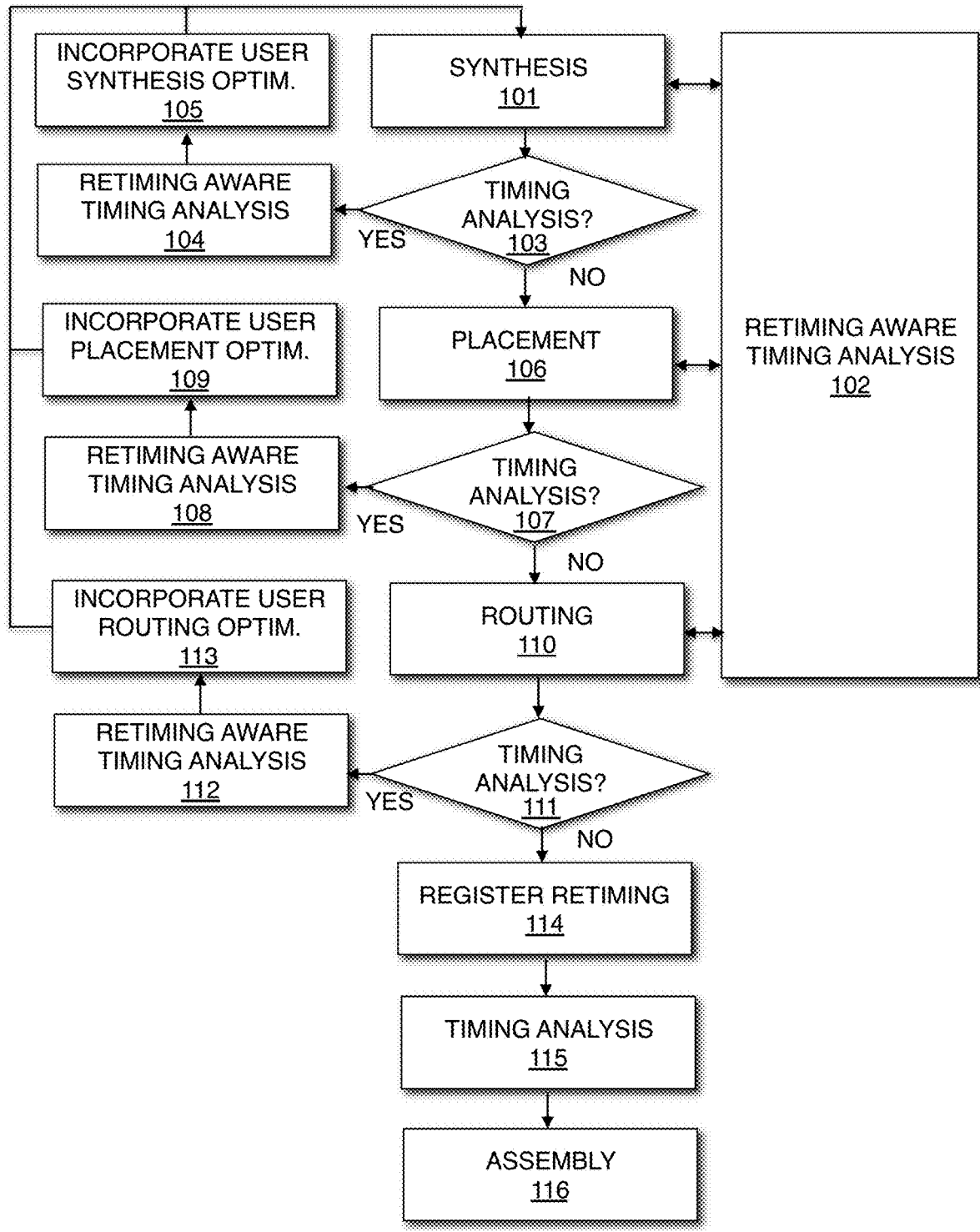
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be referred to as a compilation flow and may be performed by a computer aided design (CAD)/electronic design automation (EDA) tool implemented on a computer system.

At 101, a design for the system is synthesized. The specification for the system may be provided though a design entry tool. The specification may describe components and interconnections in the system. According to an embodiment of the present invention, the design entered may be in register transfer level (RTL) in a hardware description language (HDL). Synthesis includes generating a logic design of the system to be implemented by the target device. According to an embodiment of the present invention, synthesis generates an optimized logical representation of the system from an HDL design definition. The optimized logical representation of the system may include a representation that has a minimized number of functional blocks such as logic gates, logic elements, and registers required for the system. Synthesis also includes mapping the optimized logical representation. Mapping includes determining how to implement logic gates and logic elements in the optimized logic representation with the types or categories of resources available on the target device. The resources available on the target device may be referred to as "cells" or "components" and may include logic-array blocks, registers, memories, digital signal processing blocks, input output elements, and other components. According to an embodiment of the present invention, a netlist is generated from mapping. This netlist may be an optimized technology-mapped netlist generated from the HDL. During synthesis 101, timing analysis, as described at 102, may be performed to provide timing data to enable the synthesis procedure.

At 102 retiming aware timing analysis is performed. The retiming aware timing analysis may be performed in response to a request from synthesis 101, placement 106, or routing 110. According to an embodiment of the present invention, the retiming aware timing analysis is a timing analysis which reflects post placement and post routing register retiming optimizations that are predicted to be implemented on the design of the system. The timing analysis and post placement and post routing register retiming optimizations may be reflected in a timing analysis netlist. The results from the retiming aware timing analysis are provided back to the synthesis 101, placement 106, or routing 110 procedures.

At 103, it is determined whether a timing analysis is to be performed. According to an embodiment of the present invention, a determination as to whether a timing analysis is performed may be determined from a request from a designer. If it is determined that a timing analysis is to be performed, control proceeds to 104. If it is determined that a timing analysis is not to be performed, control proceeds to 106.

At 104, retiming aware timing analysis is performed. The retiming aware timing analysis 104 is performed to assess the synthesized design for the system. According to an embodiment of the present invention, the retiming aware timing analysis 104 may be similar to the retiming aware timing analysis performed at 102 and include a timing analysis which reflects post placement and post routing register retiming optimizations that are predicted to be implemented on the design of the system. The timing analysis and post placement and post routing register retiming optimizations may be reflected in a timing analysis netlist or other report output to the designer.

At 105, synthesis optimizations are incorporated into the design of the system. The synthesis optimizations may be modifications to the design of the system received by the designer. The modifications to the design of the system may be provided by the designer in response to the timing analysis and retiming optimization report output at 104. Control returns to 101.

At 106, the system is placed. According to an embodiment of the present invention, placement involves placing the technology-mapped logical system design on the target device. Placement includes fitting the system on the target device by determining which specific resources on the target device are to be assigned to and implemented by the technology-mapped netlist determined during synthesis. Placement may include clustering which involves grouping logic elements together to form the logic clusters present on the target device. During placement 106, timing analysis, as described at 102, may be performed to provide timing data to enable the placement procedure.

At 107, it is determined whether a timing analysis is to be performed. According to an embodiment of the present invention, a determination as to whether a timing analysis is performed may be determined from a request from a designer. If it is determined that a timing analysis is to be performed, control proceeds to 108. If it is determined that a timing analysis is not to be performed, control proceeds to 110.

At 108, retiming aware timing analysis is performed. The retiming aware timing analysis 108 is performed to assess the placed design for the system. According to an embodiment of the present invention, the retiming aware timing analysis 108 may be similar to the retiming aware timing analysis performed at 102 and include a timing analysis which reflects post placement and post routing register retiming optimizations that are predicted to be implemented on the design of the system. The timing analysis and post placement and post routing register retiming optimizations may be reflected in a timing analysis netlist or other report output to the designer.

At 109, placement optimizations are incorporated into the design of the system. The placement optimizations may be modifications to the design of the system received by the designer. The modifications to the design of the system may be provided by the designer in response to the timing analysis and retiming optimization report output at 108. Control returns to 101.

At 110, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design. During routing 110, timing analysis, as described at 102, may be performed to provide timing data to enable the routing procedure.

At 111, it is determined whether a timing analysis is to be performed. According to an embodiment of the present invention, a determination as to whether a timing analysis is performed may be determined from a request from a designer. If it is determined that a timing analysis is to be performed, control proceeds to 112. If it is determined that a timing analysis is not to be performed, control proceeds to 114.

At 112, retiming aware timing analysis is performed. The retiming aware timing analysis 112 is performed to assess the routed design for the system. According to an embodiment of the present invention, the retiming aware timing analysis 112 may be similar to the retiming aware timing analysis performed at 102 and include a timing analysis which reflects post placement and post routing register retiming optimizations that are predicted to be implemented on the design of the system. The timing analysis and post placement and post routing register retiming optimizations may be reflected in a timing analysis netlist or other report output to the designer.

At 113, routing optimizations are incorporated into the design of the system. The routing optimizations may be modifications to the design of the system received by the designer. The modifications to the design of the system may be provided by the designer in response to the timing analysis and retiming optimization report output at 112. Control returns to 101.

At 114, register retiming is performed on the system. According to an embodiment of the present invention, register retiming involves moving identified registers across combinational or routing circuit elements to reduce the length of timing-critical or near critical paths.

At 115, timing analysis is performed on the design of the system. According to an embodiment of the present invention, the timing analysis determines whether timing constraints of the system are satisfied. The timing analysis may utilize approximations depending on when it is performed. According to an embodiment of the present invention, timing analysis establishes a length for each path in the system as well as the slack for each path in the system. Slack may be defined to be the amount of delay that can be added to a path before it becomes critical or required time for signal arrival minus actual time of signal arrival.

At 116, assembly is performed. The assembly procedure involves creating a data file that includes information determined by the procedures described at 101-115. The data file may be a bit stream that may be used to program a target device. By programming the target with the data file, components on the target device are physically transformed to implement the system.

According to an embodiment of the present invention, further analysis may be performed on the design after timing analysis 115. For example, if the design does not meet timing requirements, the designer may identify what may be limiting performance and return control back to any portion of the flow for further processing.

When retiming aware timing analysis is performed, a view of the design is provided that takes into account of post placement and post routing register retiming optimizations to be implemented. By accounting for the ability of a subsequent register retiming procedure to retime the design by moving registers within a design, synthesis, placement, and routing procedures and designer provided modifications may focus on other design issues and requirements that register retiming cannot solve. For example, unidirectional or "feed-forward" logic paths which are amenable to pipelining may be addressed by register retiming. However, cyclic logic paths such as loops are less amenable to pipelining. If a design for a system includes both feed-forward and cyclic logic paths, a technique that focuses on optimizing the path with the longest delay may focus on paths that can be shortened by register retiming while neglecting other apparently shorter paths that would remain as the longer paths after register retiming is performed. Embodiments of the present invention, account for the improvements available from register retiming and output the results of these improvements to the designer. The logic paths that are critical and cannot be shortened by register retiming and should be the focus of optimizations are identified to the designer/user.

Figure 2A:
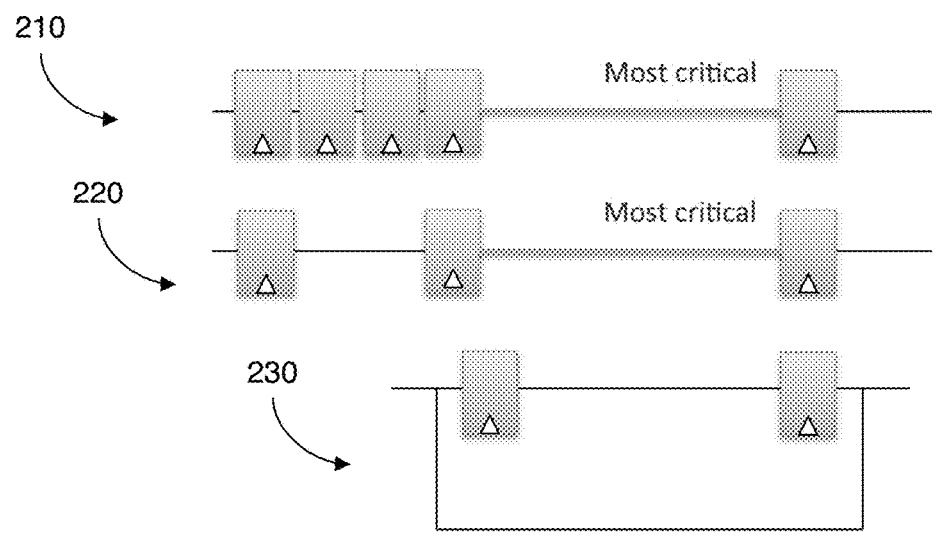
FIGS. 2A and 2B illustrate how retiming aware timing analysis presents critical paths according to an exemplary embodiment of the present invention.
Figure 2B:
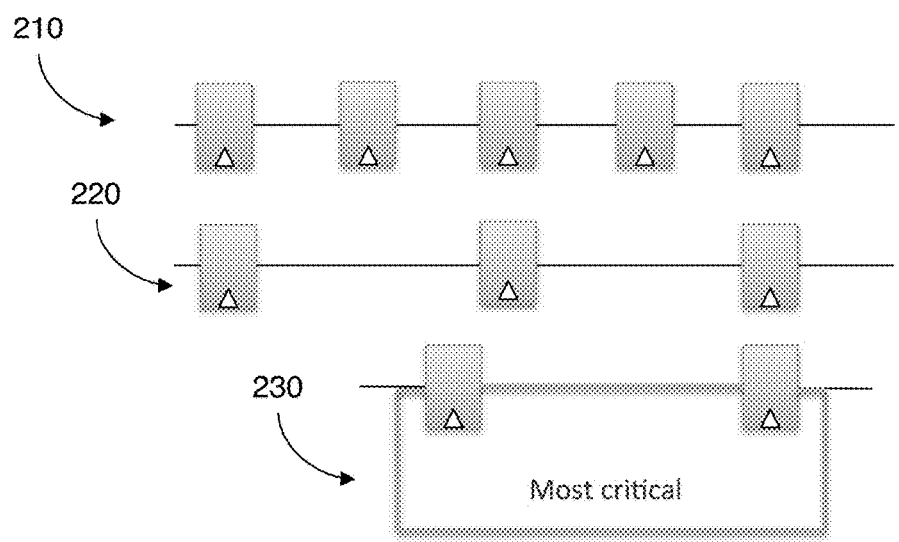

FIGS. 2A and 2B illustrate examples of how timing analysis and retiming aware timing analysis present paths according to an exemplary embodiment of the present invention. FIG. 2A illustrates how timing analysis would present paths 210, 220, and 230. As shown, timing analysis would identify paths 210 and 220 as most critical, and 230 as least critical. FIG. 2B illustrates how retiming aware timing analysis would present paths 210, 220, and 230. Retiming aware timing analysis recognizes that the registers along paths 210 and 220 would be moved after register retiming and therefore the paths would not be critical. As shown, among the three paths 210, 220, and 230, path 230, which is not retimed, is the most critical.

With the knowledge of which paths are most critical after post-placement and post-routing register retiming, a designer may focus resources to address its criticality. Referring back to FIG. 1, after a designer is provided with retiming aware timing analysis results at 104, the designer may modify the synthesized design to reduce a depth of logic on the critical paths. After the designer is provided with retiming aware analysis results at 108, the designer may modify the placed design by moving loops closer together. After the designer is provided with retiming aware analysis results at 112, the designer may modify the routed design by shortening the routing on the critical paths. It should be appreciated that other modifications and optimizations may be made by the designer such as removing levels of logic, restructuring the design to remove the loop, add registers, and changing the functionality of the design.

Figure 3:
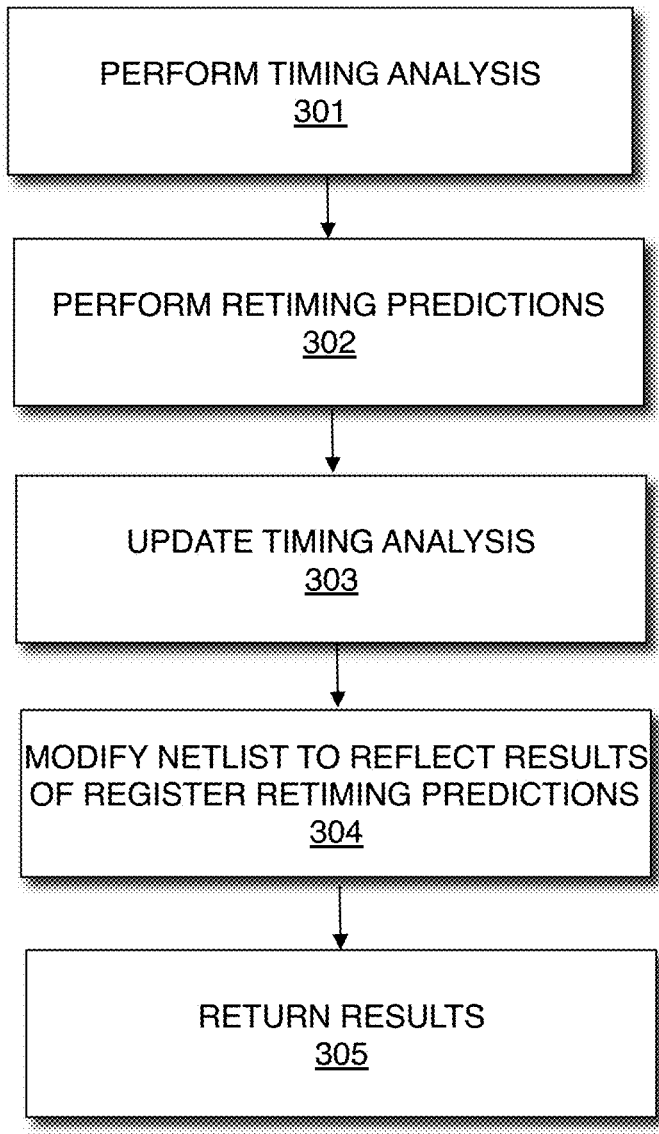
FIG. 3 is a flow chart illustrating a method for performing retiming aware timing analysis according to an exemplary embodiment of the present invention.

FIG. 3 is a flow chart illustrating a method for performing retiming aware timing analysis according to an exemplary embodiment of the present invention. The method illustrated in FIG. 3 may be used to implement procedures 102, 104, 108, and 112 as shown in FIG. 1. At 301, timing analysis is performed. According to an embodiment of the present invention, the timing analysis may include the procedures performed at 115 where a determination is made as to whether timing constraints of the system are satisfied with a design of the system. It should be appreciated that the timing analysis may utilize estimations and approximations depending on when it is performed. The earlier in the compilation flow when timing analysis is called, the more estimations and approximations may be utilized. According to an embodiment of the present invention, timing analysis establishes a length for each path in the system as well as the slack for each path in the system. Slack may be defined to be the amount of delay that can be added to a path before it becomes critical or required time for signal arrival minus actual time of signal arrival.

At 302, retiming predictions are performed. Based upon the timing analysis performed at 301 and a stage of the design that has been completed, post placement and post routing register retiming optimizations to be implemented on the design of the system are predicted. According to an embodiment of the present invention, an abbreviated register retiming may be performed to generate the predictions. For example, register retiming may be performed using a design that is only partially complete due to the stage of compilation where retiming aware timing analysis is performed and not all information on the design needed for a full register retiming analysis may be available. In other embodiments, one or more restrictions on register retiming may be ignored in order to generate predictions more quickly. Alternatively, a complete register retiming analysis may be performed using all information available to complete a detailed analysis.

At 303, timing analysis is updated. According to an embodiment of the present invention, the timing analysis performed at 301 is updated to include the register retiming optimization predicted to be implemented on the system.

At 304, a timing analysis netlist is updated to reflect the register retiming optimizations predicted to be implemented on the system. According to an embodiment of the present invention, the register retiming optimizations may be reflected as clock skew or a positive or negative delay element on data path. Alternatively, the register retiming optimizations may be reflected as discreet register retiming where registers are actually moved in the design of the system.

At 305, the results of retiming aware timing analysis are output. When the retiming aware timing analysis is called by a procedure in the compilation flow, such as synthesis, placement, or routing, the retiming aware timing analysis may be sent to the procedure. When the retiming aware timing analysis is initiated by the designer, the retiming aware timing analysis may be sent to the designer. The retiming aware timing analysis results provide the designer with an accurate perspective of the design of the system after post placement and post routing register retiming.

Figure 4A:
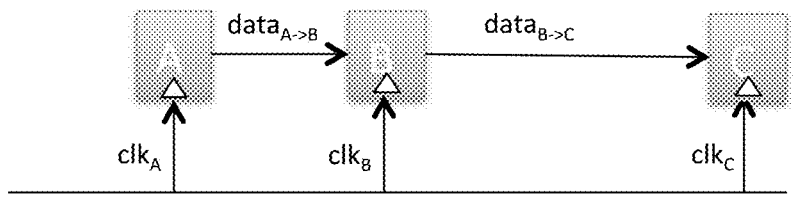
FIGS. 4A-C illustrate how a netlist may be modified to reflect results of register retiming predictions according to an exemplary embodiment of the present invention.
Figure 4B:
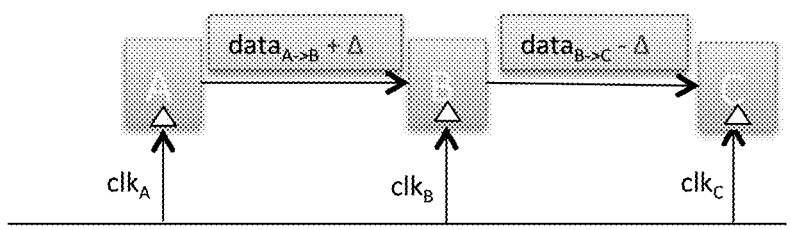
Figure 4C:
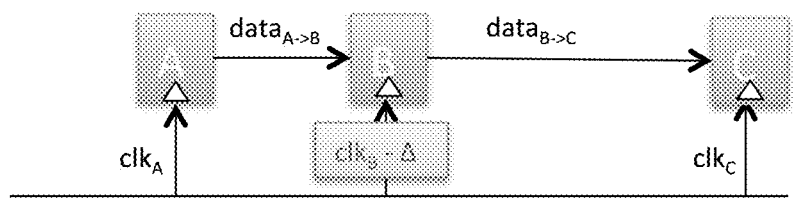

FIGS. 4A-C illustrate how a netlist may be modified to reflect results of register retiming predictions according to an exemplary embodiment of the present invention. FIG. 4A illustrates a data path where register A is clocked by signal $clk_A$, register B is clocked by signal $clk_B$, and register C is clocked by signal $clk_C$. The time required for data to be transmitted from register A to register B is $data_{A \to B}$. The time required for data to be transmitted from register B to register C is $data_{B \to C}$. The slack for transmitting data between registers A and B, and the slack for transmitting data between registers B and C may be represented by the following, where T is a clock period.

$$Slack_{A \to B} = T + clk_B - clk_A - data_{A \to B}$$

$$Slack_{B \to C} = T + clk_C - clk_B - data_{B \to C}$$

FIG. 4B illustrates the data path in FIG. 4A retimed by moving register B forward towards register C to effectuate a delay Δ. The register retiming performed may be represented by adding a positive delay element between register A and register B, and adding a negative delay element between register B and register C as shown. The slack for transmitting data between registers A and B, and the slack for transmitting data between registers B and C in FIGS. 4B and 4C may be represented by the following.

$$Slack_{A \to B}^{new} = T + clk_B - clk_A - (data_{A \to B} + \Delta)$$

$$Slack_{B \to C}^{new} = T + clk_C - clk_B - (data_{B \to C} - \Delta)$$

FIG. 4C illustrates the data path in FIG. 4A retimed by moving register B forward towards register C to effectuate a delay Δ. The register retiming performed may be represented by adding clock skew to register B as shown. The slack for transmitting data between registers A and B, and the slack for transmitting data between registers B and C in FIGS. 4B and 4C may be represented by the following.

$$Slack_{A \to B}^{new} = T + (clk_B - \Delta) - clk_A - data_{A \to B}$$

$$Slack_{B \to C}^{new} = T + clk_C - (clk_B - \Delta) - data_{B \to C}$$

Figure 5:
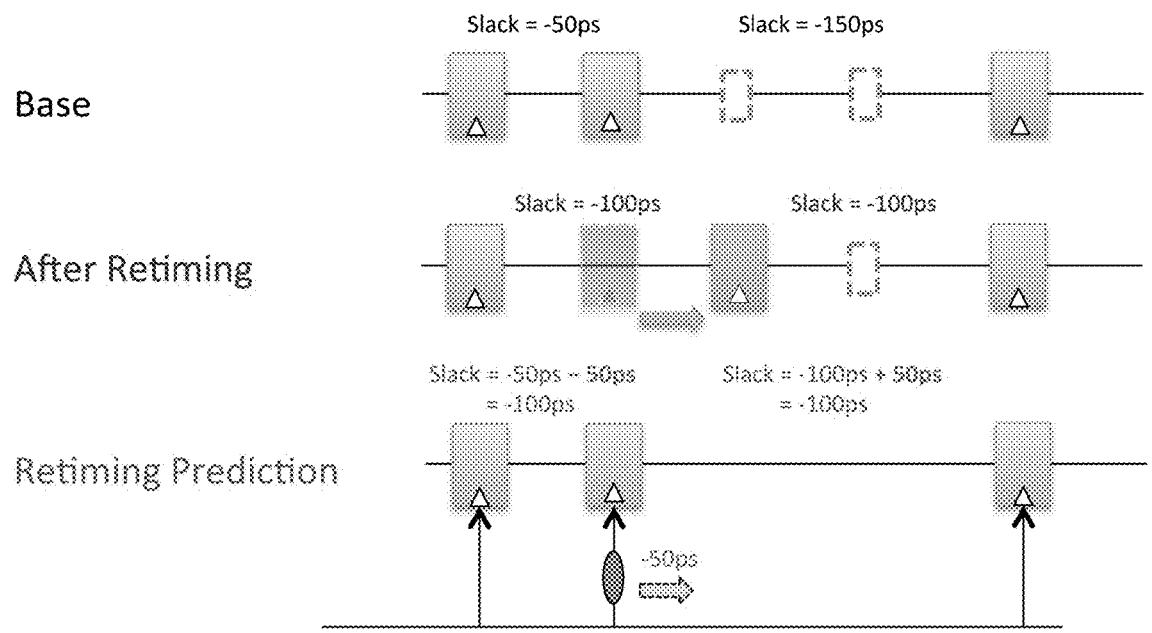
FIG. 5 illustrates how a netlist may be modified to reflect results of register retiming predictions according to another exemplary embodiment of the present invention.

FIG. 5 illustrates how a netlist may be modified to reflect results of register retiming predictions according to another exemplary embodiment of the present invention. The path labeled "Base" includes three registers and illustrates the slack prior to implementing any register retiming optimizations. The slack between the first and second registers is −50 ps, and the slack between the second and third registers is −150 ps.

The path labeled "After Retiming" illustrates the path after register retiming optimizations are performed. A shown, the second register is moved along the path towards the third register. The move changes the slack between the first and second register from −50 ps to −100 ps. The move also changes the slack between the second and third registers from −150 ps to −100 ps.

The path labeled "Retiming Prediction" illustrates the path as represented in a timing analysis netlist after retiming aware timing analysis. Instead of representing the register retiming optimization with the movement of second register, the register retiming optimization is represented by changing the clock delay to the second register. As shown, the clock input to the second register is delayed by −50 ps. This adjustment to the clock delay to the second register changes the slack between the first and second register from −50 ps to −100 ps. The move also changes the slack between the second and third register from −150 ps to −100 ps. This allows the register retiming optimizations to be modeled using pure delay adjustments without requiring structural changes to the design of the system.

Figure 6:
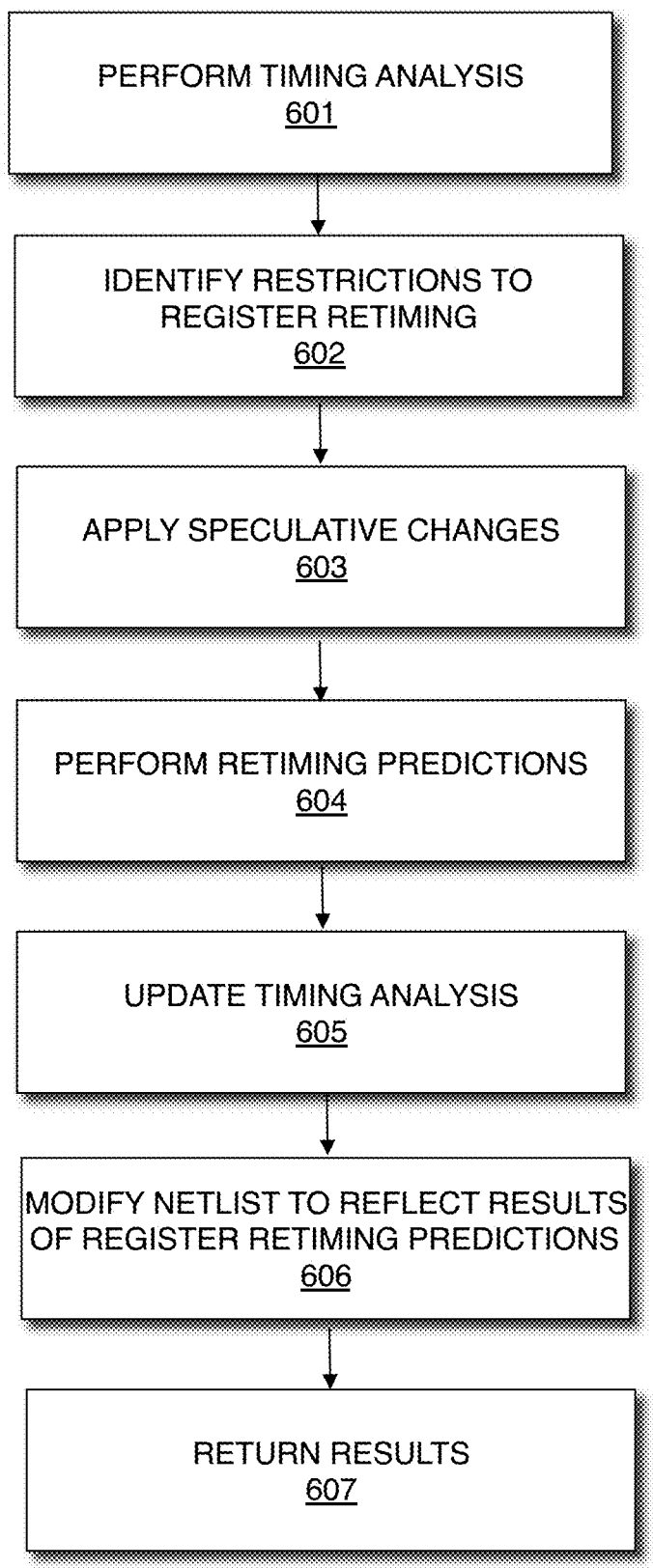
FIG. 6 illustrates a method for performing retiming-aware timing analysis accounting for speculative changes according to an exemplary embodiment of the present invention.

FIG. 6 illustrates a method for performing retiming aware timing analysis accounting for speculative changes according to an exemplary embodiment of the present invention. The method illustrated in FIG. 6 may be used to implement procedures 104, 108, or 112 as shown in FIG. 1. Speculative register retiming modifies constructs in a design that restricts or hinders register retiming to improve retimed result for the system. According to an embodiment of the present invention, speculative changes allow the system to provide recommendations to the designer or user of a design tool to indicate what changes could be made to improve performance and the estimated performance gain that would be realized with these changes. The speculative changes that are implemented for the modifications to the design may be made in response to feedback provided by the designer on speculative changes made during a prior iteration of retiming aware timing analysis. During an initial iteration of retiming aware timing analysis where designer/user feedback is unavailable, speculative changes may be selected using a predefined set of speculative actions according to a preset priority.

At 601, timing analysis is performed. According to an embodiment of the present invention, the timing analysis may include the procedures performed at 115 from FIG. 1 where a determination is made as to whether timing constraints of the system are satisfied with a design of the system. It should be appreciated that the timing analysis may utilize estimations and approximations depending on when it is performed. The earlier in the compilation flow when timing analysis is called, the more estimations and approximations may be utilized. According to an embodiment of the present invention, timing analysis establishes a length for each path in the system as well as the slack for each path in the system. Slack may be defined to be the amount of delay that can be added to a path before it becomes critical or required time for signal arrival minus actual time of signal arrival.

At 602, restrictions to register retiming in the design are identified. Restrictions to register retiming may include any construct in the design that limit the ability to retime. An example of a restriction to register retiming may be a particular register's inability to support a type of functionality, where the particular register is to be used for retiming another register that utilizes the functionality. According to an aspect of the present invention, the functionality may be the ability to support asynchronous clears. Another example of a restriction to register retiming is a designer/user directive that prohibits or limits movement of a register that should be moved for retiming. It should be appreciated that other restrictions may also be identified.

According to an embodiment of the present invention, speculative changes on the design that would improve register retiming performance may also be identified. For example, additional pipelining at asynchronous clock crossings may be provided. Read/write timing relationships on dual-port RAMs may be adjusted. Additional pipelining may be provided on an edge that is marked as a false-path, indicating that the designer/user does not care about timing along the edge. Internal pipelining on RAMs and DSPs may be increased. Registers that are the target of a cross-clock transfer may be allowed to move.

At 603, speculative changes are applied to the design. According to an embodiment of the present invention, the speculative changes are applied to remove restrictions to register retiming and/or improve register retiming performance where register retiming is needed to reduce the criticality of a path. The speculative changes are applied to the design according to designer specified preferences on speculative changes made in a prior iteration of retiming aware timing analysis. The designer specified preferences include designer/user feedback as to which speculative changes are acceptable and which speculative changes are not acceptable. According to an embodiment of the present invention where retiming aware timing analysis is performed a first time and no designer specified preferences are available, a predefined set of speculative changes may be performed according to a preset priority. According to an embodiment of the present invention, the predefined set of speculative actions may be performed according to the following order. First, asynchronous clears are removed and/or converted to synchronous clears. Second, designer/user directives are removed. Third, pipelining is added by adding registers to either side of an asynchronous clock transfer.

At 604, retiming predictions are performed. Based upon the timing analysis performed at 601, the speculative changes applied at 603, and a stage of the design that has been completed, post placement and post routing register retiming optimizations to be implemented on the design of the system are predicted. According to an embodiment of the present invention, an abbreviated register retiming may be performed to generate the predictions. For example, register retiming may be performed using a design that is only partially complete due to the stage of compilation where retiming aware timing analysis is performed and not all information on the design needed for a full register retiming analysis may be available. In other embodiments, one or more restrictions on register retiming may be ignored in order to generate predictions more quickly. Alternatively, a complete register retiming analysis may be performed using all information available to complete a detailed analysis.

At 605, timing analysis is updated. According to an embodiment of the present invention, the timing analysis performed at 601 is updated to include the register retiming optimization predicted to be implemented on the system.

At 606, a timing analysis netlist is updated to reflect the register retiming optimizations predicted to be implemented on the system. According to an embodiment of the present invention, the register retiming optimizations may be reflected as clock skew or a positive or negative delay element on data path. Alternatively, the register retiming optimizations may be reflected as discreet register retiming where registers are actually moved in the design of the system.

At 607, the results of retiming aware timing analysis are output to the designer. The retiming aware timing analysis results provide the designer with an accurate perspective of the design of the system after post placement and post routing register retiming.

According to an embodiment of the present invention, after performing a retiming aware timing analysis accounting for speculative change at 104, 108, and 112, the designer may provide feedback on the speculative changes implemented together with other optimizations at 105, 109, and 113. The designer feedback provided at 105, 109, and 113 may be utilized during a subsequent iteration of the retiming aware timing analysis when making speculative changes. Based on the designer feedback, modifications may also be made to the design to implement the speculative changes that are desirable and that improve register retiming.

Embodiments of the present invention allow speculative changes for register retiming to be performed with the guidance of designer feedback. When faced with a path that cannot be retimed, speculative register retiming may have a plurality of options of speculative changes that can be made to allow retiming to proceed. Instead of allowing speculative register retiming to select an option that may undermine an optimization achieved during a previous compilation, designer/user feedback may be used to select an ideal option. Embodiments of the present invention allow the designer/user to guide the compilation and speculative register retiming by indicating which speculative actions will be implemented and which speculative actions will not be implemented in future modifications of the design. Future iterations of compilation, during register retiming analysis, may perform optimizations based on the changes the will be made, and future iterations of speculative register retiming may avoid speculating changes that will not be made. According to an embodiment of the present invention, designer/user feedback may be provided in a format other than and independent of source RTL. This allows the designer/user to better explore the benefits of the speculative changes without needing to modify the code. It should be appreciated that although specific examples are provided for the speculative changes to improve register retiming, other changes may also be implemented to improve register retiming.

Figure 7:
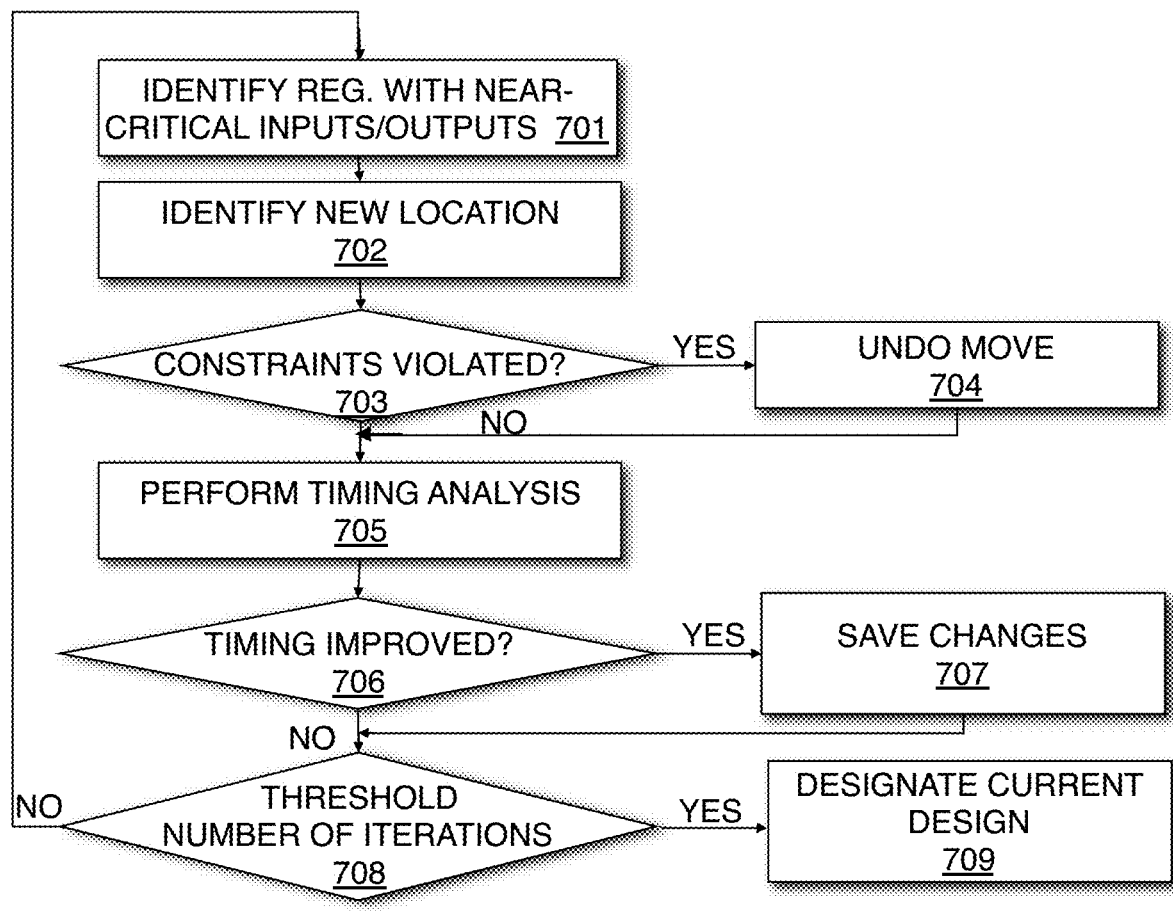
FIG. 7 illustrates a method for performing register retiming according to an exemplary embodiment of the present invention.

FIG. 7 illustrates a method for performing register retiming according to an exemplary embodiment of the present invention. FIG. 7 is a flow chart illustrating a method for performing register retiming according to an exemplary embodiment of the present invention. The method illustrated in FIG. 7 may be used to implement 114 shown in FIG. 1. It should be appreciated that other methodologies may also be used to implement 109. At 701, registers with inputs connected to near-critical paths are identified and registers with outputs coupled to near-critical paths are identified. According to an embodiment of the present invention, a near-critical path is a path in the system with a slack value below a threshold value.

At 702, the identified registers at 701 are moved to new locations. According to an embodiment of the present invention, a new location may be identified for each identified register by moving the register backwards on the near-critical path to an input of a component. For the backward push to occur, the register needs to be present on each fanout of the component. According to an embodiment of the present invention, a new location may be identified by moving the register forward on the near-critical path to an output of a component. For the forward push to occur, the register needs to be present on each input of the component. According to an alternate embodiment of the present invention, a new location may be identified for the register by solving a plurality of equations with constraints to reduce criticality.

At 703, for each register moved, it is determined whether moving the registers to its new location at 702 causes a violation of a constraint. According to an embodiment of the present invention, constraints may include designer/user-defined timing constraints. Constraints may include area constraints for the system such as global constraints on the maximum area increase allowed and constraints that ensure that registers are created evenly across the system. Constraints may include architectural constraints that define rules for handling carry chains and various restrictions on secondary signals such as control signals. Constraints may include designer/user defined constraints such as constraints that prohibit the placement of components on designated sections of the target device. It should be appreciated that other types of constraints may also be defined and included for the purpose of determination of violation at 703. If it is determined that moving a register to its new location causes a violation of a constraint, control proceeds to 704. If it is determined that moving a registers to its new location does not cause a violation of a constraint, control proceeds to 705.

At 704, moves that result in violations are undone. Control proceeds to 705.

At 705, timing analysis is performed. Timing analysis establishes the length for each path in the system as well as the slack for each path in the system.

At 706, it is determined whether the timing of the system has improved. Determining whether timing of the system has improved may be achieved by comparing the slack values of near-critical paths in the recently retimed system design with a previous system design. If the timing of the system has improved, control proceeds to 707. If the timing of the system has not improved, control proceeds to 708.

At 707, the current changes to the system are saved. The current changes to the system include the changes made at 702.

At 708, it is determined whether a threshold number of iterations of 701-707 has been performed. If a threshold number of iterations of 701-707 has not been performed, control returns to 701. If a threshold number of iterations of 701-707 has been performed, control proceeds to 709.

At 709, the current changes saved at 707 are designated as the current design for the system. The procedures described in FIG. 7 may be referred to as discreet register retiming.

According to an embodiment of the present invention, the procedures illustrated in FIGS. 1, 3, 6, and 7 may be performed by an EDA tool executed on a first computer system. A data file may be generated and transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. By programming the target with the data file, components on the target device are physically transformed to implement the system.

FIGS. 1, 3, 6, and 7 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 8:
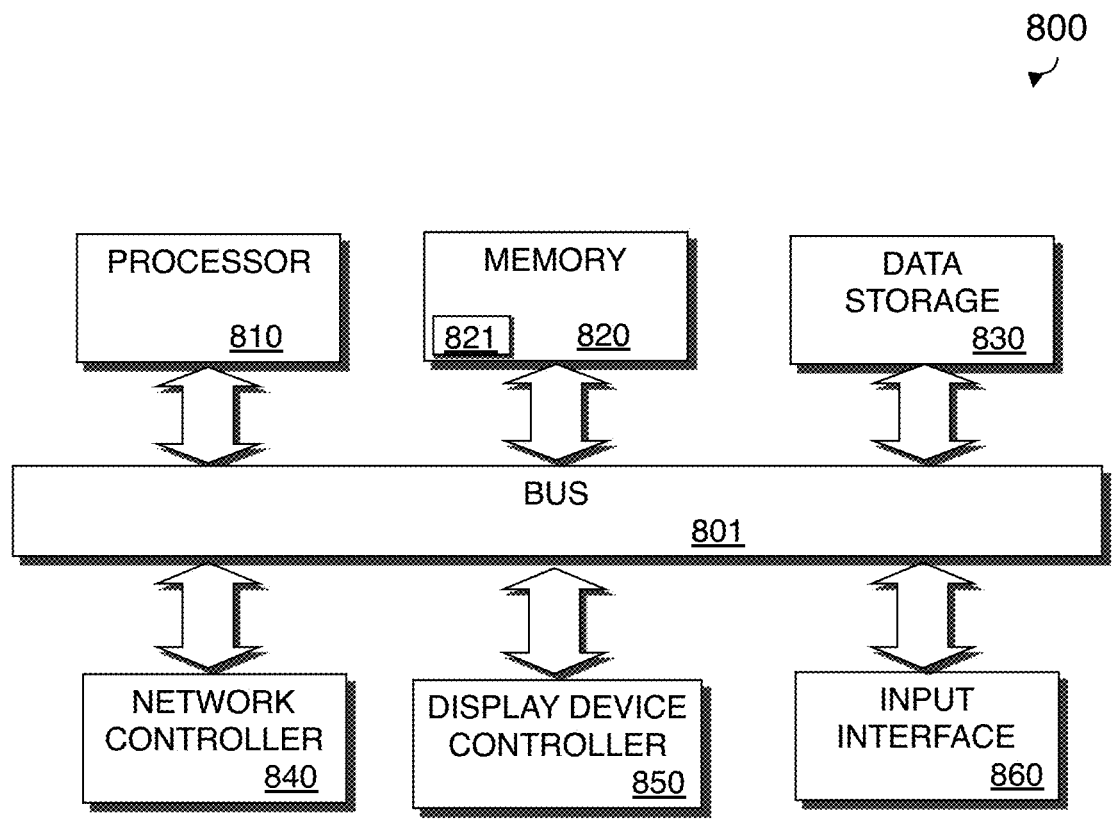
FIG. 8 illustrates a block diagram of a computer system implementing a system designer according to an embodiment of the present invention.

FIG. 8 illustrates a block diagram of a computer system 800 implementing a system designer according to an embodiment of the present invention. The computer system 800 includes a processor 810 that process data signals. The processor 810 is coupled to a bus 801 or other switch fabric that transmits data signals between processor 810 and other components in the computer system 800. The computer system 800 includes a memory 820. The memory 820 may store instructions and code represented by data signals that may be executed by the processor 810. A data storage device 830 is also coupled to the bus 801

A network controller 840 is coupled to the bus 801. The network controller 840 may link the computer system 800 to a network of computers (not shown) and supports communication among the machines. A display device controller 850 is coupled to the bus 801. The display device controller 850 allows coupling of a display device (not shown) to the computer system 800 and acts as an interface between the display device and the computer system 800. An input interface 860 is coupled to the bus 801. The input interface 860 allows coupling of an input device (not shown) to the computer system 800 and transmits data signals from the input device to the computer system 800.

A system designer 821 may reside in the memory 820 and be executed by the processor 810. According to an embodiment of the present invention, the system designer 821 includes a retiming aware timing analysis unit. The retiming aware timing analysis unit may perform a retiming aware timing analysis after each synthesis, placement, and routing procedure in a compilation flow. The retiming aware timing analysis is provided to a designer and the designer is allowed to modify a design for the system without having to wait for the entire compilation of the design to be completed. The retiming aware timing analysis reflects post placement and post routing register retiming optimizations that are predicted to be implemented. According to an aspect of the present invention, the post placement and post routing register retiming optimizations predicted to be implemented are enabled by speculative changes made to the design of the system. The speculative changes may be presented to the designer with timing analysis results, and actual changes to the design may be made in response to feedback provided by the designer.

Figure 9:
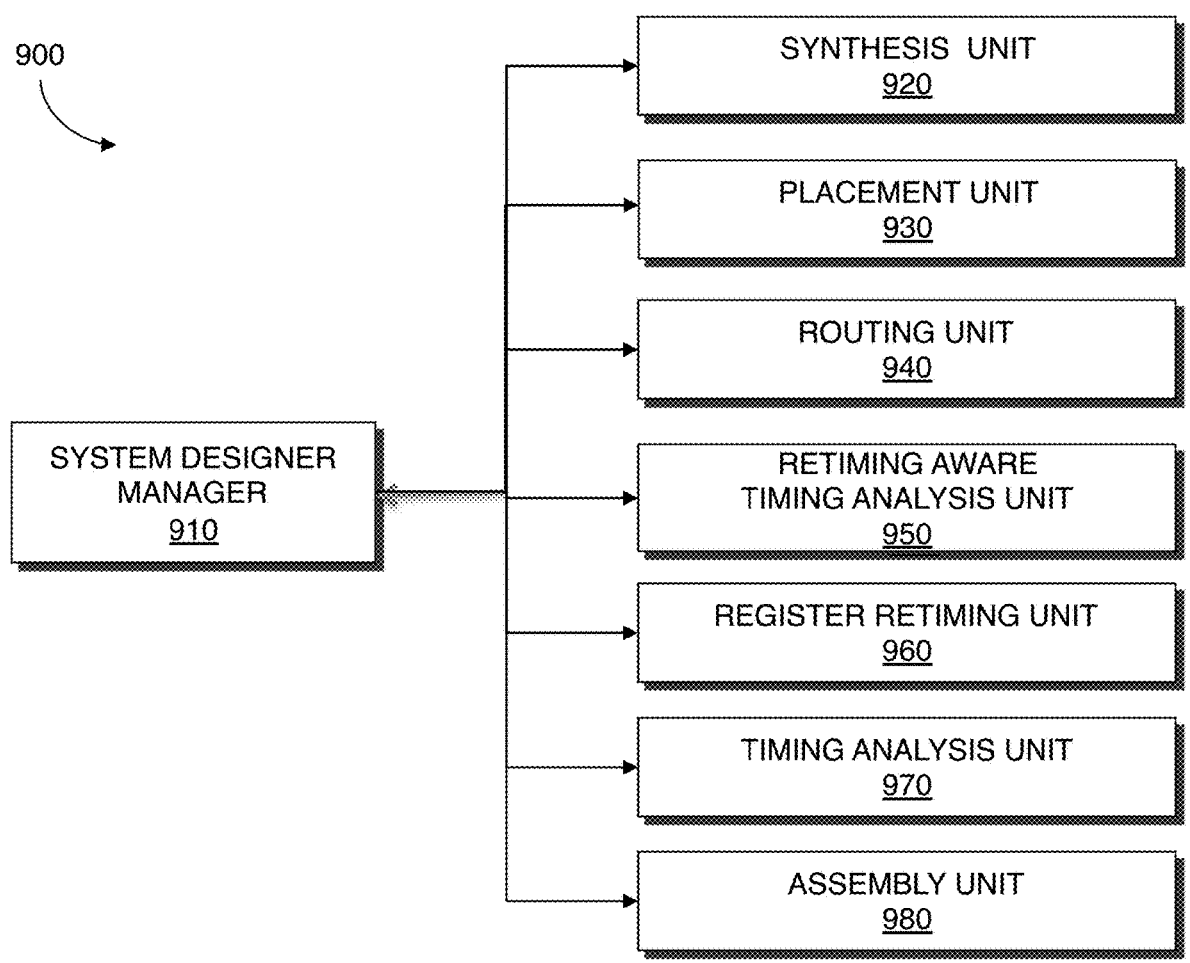
FIG. 9 is a block diagram of a system designer according to an embodiment of the present invention.

FIG. 9 illustrates a system designer 900 according to an embodiment of the present invention. The system designer 900 may be used to implement the system designer 821 illustrated in FIG. 8. The system designer 900 may be an EDA tool for designing a system on a target device such as an FPGA, ASIC, structured ASIC, or other circuitry. FIG. 9 illustrates modules implementing an embodiment of the system designer 900. According to one embodiment, the modules represent software modules and system design may be performed by a computer system such as the one illustrated in FIG. 8 executing sequences of instructions represented by the modules shown in FIG. 9. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 900 includes a designer manager 910. The system designer manager 910 is connected to and transmits data between the other components of the system designer 900. The system designer manager 910 provides an interface that allows a designer/user such as a designer to input data into the system designer 900 and that allows the system designer 900 to output data to the designer/user. According to an embodiment of the present invention, a design for the system, modifications to the design, and feedback regarding speculative changes to the design may be input using the system designer manager 910. A report of the retiming aware timing analysis, speculative changes made to the design, and performance attained by the speculative changes may be output by the system design manager 910.

The system designer 900 includes a synthesis unit 920. The synthesis unit 920 generates a logic design of the system to be implemented by the target device. According to an embodiment of the present invention, the synthesis unit 920 generates an optimized logical representation of the system from the HDL design definition and maps the optimized logic design. According to an embodiment of the present invention, a netlist is generated from mapping. This netlist may be an optimized technology-mapped netlist generated from the HDL.

The system designer 900 includes a placement unit 930. According to an embodiment of the present invention, the placement unit 930 places the mapped logical system design on the target device. Placement works on the technology-mapped netlist to produce a placement for each of the functional blocks. According to an embodiment of the present invention, placement unit 930 fits the system on the target device by determining which resources on the logic design are to be used for specific logic elements, and other function blocks determined to implement the system as determined during synthesis. Placement may include clustering which involves grouping logic elements together to form the logic clusters present on the target device.

The system designer 900 includes a routing unit 940 which routes the placed design on the target device. The routing unit 940 allocates routing resources on the target device to provide interconnections between logic gates, logic elements, and other components on the target device. The routing unit 940 may also perform routability optimization on the placed logic design.

The system designer 900 includes a retiming aware timing analysis unit 950. The retiming aware timing analysis unit 950 performs a retiming aware timing analysis in response to a request from the synthesis unit 920, placement unit 930, routing unit 940, or from a designer. The retiming aware timing analysis reflects post placement and post routing register retiming optimizations that are predicted to be implemented on the design of the system. The timing analysis and post placement and post routing register retiming optimizations may be reflected in a timing analysis netlist generated by the retiming aware timing analysis unit 950. The results from the retiming aware timing analysis is provided back to the request originator.

According to an embodiment of the present invention, the retiming aware timing analysis unit 950 may perform retiming aware timing analysis in response to speculative changes made to the design to improve register retiming. A speculative register retiming unit (not shown) may identify restrictions to register retiming and apply speculative changes in response to a predetermined set of priorities and/or preferences provided by the designer.

According to an embodiment of the present invention, the designer may request that retiming aware timing analysis be performed after synthesis, placement, or routing without waiting for an entire compilation of the design. This allows the designer to see the design at early stages and allows the designer to make modifications to improve the design at the early stages. When retiming aware timing analysis is performed, a view of the design is provided back to the designer that takes into account of post placement and post routing register retiming optimizations to be implemented.

The system designer 900 includes a register retiming unit 960. According to an embodiment of the present invention, the register retiming unit 960 moves identified registers across combinational circuit elements to reduce the length of timing-critical or near critical paths as determined. The register retiming unit 960 may perform the procedures illustrated in FIG. 7.

The system designer 900 includes a timing analysis unit 980 which performs timing analysis on the design of the system generated. According to an embodiment of the present invention, the timing analysis determines whether timing constraints of the system are satisfied. The timing analysis unit 980 may establishes a length for each path in the system as well as the slack for each path in the system. Slack may be defined to be the amount of delay that can be added to a path before it becomes critical or required time for signal arrival minus actual time of signal arrival.

The system designer 900 includes an assembly unit 980. According to an embodiment of the present invention, the assembly unit 980 creates a data file that describes the design of the system. The data file may be a bit stream that may be used to program a target device. By programming the target device with the data file, the target device is physically transformed to implement the system. It should be appreciated that the modules in the system designer 900 may implement the procedures described with reference to FIGS. 1, 3, 6, and 7.

According to an embodiment of the present invention, when performing the compilation flow described, data from synthesis, placement, and routing are stored in registers in a memory of a computer system. After retiming aware timing analysis is completed after the synthesis, placement, and/or routing, the resulting modified data may be stored in a second set of registers in the memory. The modified data from the retiming aware timing analysis may be output to a designer via a display device controller or other output device. Input provided by the designer may be received via an input interface. Modifications to the synthesis placement, and/or routing resulting from the input provided by the designer may be stored in a third set of registers in the memory. A data file that describes the system may be stored in a data storage device and/or output from the computer system.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 10:
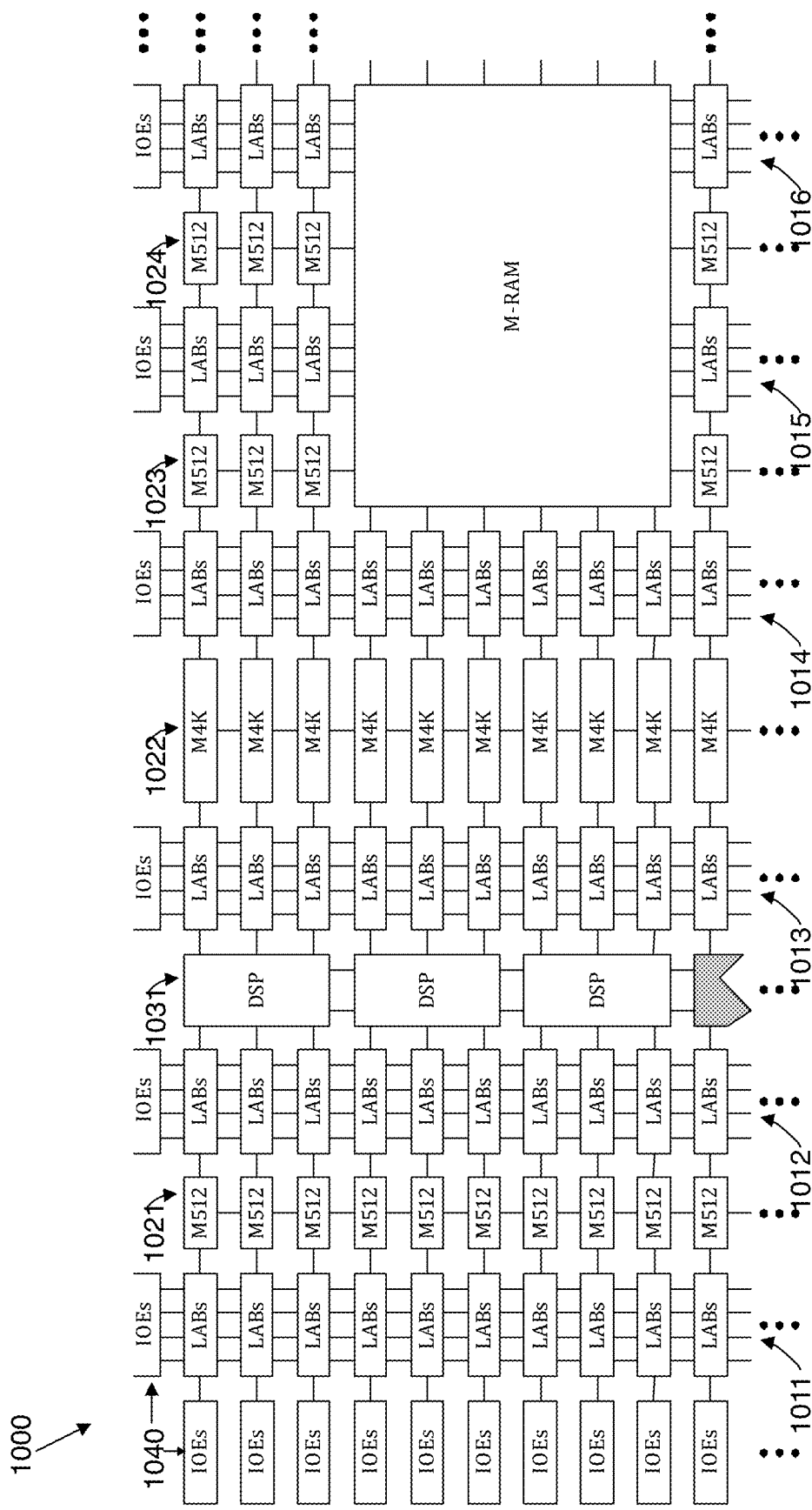
FIG. 10 illustrates an exemplary target device according to an embodiment of the present invention.

FIG. 10 illustrates a device 1000 that may be used to implement a target device according to an embodiment of the present invention. The device 1000 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1000. Columns of LABs are shown as 1011-1016. It should be appreciated that the logic block may include additional or alternate components.

The device 1000 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1000. Columns of memory blocks are shown as 1021-1024.

The device 1000 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1000 and are shown as 1031.

The device 1000 includes a plurality of input/output elements (IOEs) 1040. Each IOE feeds an IO pin (not shown) on the device 1000. The IOEs 1040 are located at the end of LAB rows and columns around the periphery of the device 1000. Each IOE may include a bidirectional IO buffer and a plurality of registers for registering input, output, and output-enable signals.

The device 1000 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
   performing synthesis by generating a logic design of the system to be implemented by the target device;
   performing a first retiming aware timing analysis after the synthesis to assess the synthesized logic design of the system that reflects first register retiming optimizations predicted to be implemented on the logic design of the system;
   incorporating synthesis optimizations into the logic design of the system that are modifications to the logic design of the system provided by a designer in response to the first register retiming optimizations;
   placing the logic design of the system on the target device;
   performing a second retiming aware timing analysis after the placing to assess the placed logic design of the system that reflects second register retiming optimizations predicted to be implemented on the logic design of the system;
   incorporating placement optimizations into the logic design of the system that are modifications to the logic design of the system provided by the designer in response to the second register retiming optimizations;
   routing the placed logic design of the system on the target device;
   performing a third retiming aware timing analysis after the routing to assess the routed logic design of the system that reflects third register retiming optimizations predicted to be implemented on the logic design of the system;

incorporating routing optimizations into the logic design of the system that are modifications to the logic design of the system provided by the designer in response to the third register retiming optimizations;

generating a data file that includes the logic design of the system; and programming the target device with the data file to physically transform components on the target device to implement the system.

2. The method of claim 1, wherein synthesis, placement, and routing on the system is performed in response to the first, second, and third register retiming optimizations predicted to be implemented on the system.

3. The method of claim 1, wherein the first, second, or third register retiming optimizations comprise pipelining a critical path.

4. The method of claim 1, wherein the first, second, or third register retiming optimizations comprise modifying one or more of a position of and input to a register to reduce a criticality of a path in the system.

5. The method of claim 1, further comprising performing register retiming.

6. The method of claim 1, wherein one of incorporating the synthesis optimizations, incorporating the placement optimizations, or incorporating the routing optimizations comprises removing a loop in the system.

7. The method of claim 1, wherein the first register retiming optimizations are based on speculative changes made to a design of the system that cause the system to provide recommendations to the designer to indicate what changes can be made to improve performance and an estimated performance gain to be realized with the changes.

8. The method of claim 7, where the speculative changes are based on specified preferences of the designer.

9. The method of claim 1, wherein the first, second, or third register retiming optimizations predicted comprise adding pipelining to a critical path.

10. The method of claim 1, wherein the synthesis is modified by reducing a depth of logic in the system.

11. The method of claim 1, wherein incorporating the synthesis, placement, and routing optimizations are performed prior to completing a compilation of the system.

12. The method of claim 11, wherein the compilation of the system includes synthesis, placement, routing, and register retiming.

13. A method for designing a system on a target device, the method comprising:

performing one of synthesis, placement, and routing on the system by generating a logic design of the system to be implemented by the target device;

performing a retiming aware timing analysis after the one of the synthesis, placement, and routing to assess the logic design of the system that reflects register retiming optimizations predicted to be implemented on the logic design of the system;

incorporating optimizations into the logic design of the system that are modifications to the logic design of the system provided by a designer in response to the register retiming optimizations, wherein incorporating the optimizations comprises changing a functionality of an aspect of the system to shorten a loop in the system;

generating a data file that includes the logic design of the system; and programming the target device with the data file to physically transform components on the target device to implement the system.

14. A non-transitory computer readable medium including a sequence of instructions stored thereon for causing a computer to execute a method for designing a system on a target device, comprising:

performing synthesis on the system by generating a logic design of the system to be implemented by the target device;

performing a first retiming aware timing analysis after the synthesis to assess the synthesized logic design of the system that reflects first register retiming optimizations predicted to be implemented on the logic design of the system;

incorporating synthesis optimizations into the logic design of the system that are modifications to the logic design of the system provided by a designer in response to the first register retiming optimizations;

placing the logic design of the system on the target device;

performing a second retiming aware timing analysis after the placing to assess the placed logic design of the system that reflects second register retiming optimizations predicted to be implemented on the logic design of the system;

incorporating placement optimizations into the logic design of the system that are modifications to the logic design of the system provided by the designer in response to the second register retiming optimizations;

routing the placed logic design of the system on the target device;

performing a third retiming aware timing analysis after the routing to assess the routed logic design of the system that reflects third register retiming optimizations predicted to be implemented on the logic design of the system;

incorporating routing optimizations into the logic design of the system that are modifications to the logic design of the system provided by the designer in response to the third register retiming optimizations;

generating a data file that includes the logic design of the system; and programming the target device with the data file to physically transform components on the target device to implement the system.

15. The non-transitory computer readable medium of claim 14, wherein the method further comprises:

presenting the designer with the second retiming aware timing analysis of the system after the placement, and wherein incorporating the placement optimizations further comprises incorporating input from the designer received after the placement to modify the placement.

16. The non-transitory computer readable medium of claim 15, wherein the method further comprises:

presenting the designer with the third retiming aware timing analysis of the system after the routing, and wherein incorporating the routing optimizations further comprises incorporating input from the designer received after the routing to modify the routing.

17. The non-transitory computer readable medium of claim 15, wherein the placement is modified by placing a register and logic closer together to reduce loop delay.

18. The non-transitory computer readable medium of claim 16, wherein the method further comprises performing register retiming on the system after the routing.

19. The non-transitory computer readable medium of claim 16, wherein the routing is modified by shortening a path of a loop.

20. The non-transitory computer readable medium of claim 14, wherein incorporating the synthesis optimizations is performed prior to the placement and routing of the system.

\* \* \* \* \*